J. M. JOHNSON.
TRACTOR.
APPLICATION FILED NOV. 22, 1917.

1,354,108.

Patented Sept. 28, 1920.
2 SHEETS—SHEET 2.

WITNESS:
F. C. Fliedner
J. H. Herring

INVENTOR.
John M. Johnson
BY
Strong & Townsend
ATTORNEYS.

UNITED STATES PATENT OFFICE.

JOHN M. JOHNSON, OF WINTERS, CALIFORNIA.

TRACTOR.

1,354,108.  Specification of Letters Patent.  Patented Sept. 28, 1920.

Application filed November 22, 1917. Serial No. 203,308.

*To all whom it may concern:*

Be it known that I, JOHN M. JOHNSON, a citizen of the United States, residing at Winters, in the county of Yolo and State of California, have invented new and useful Improvements in Tractors, of which the following is a specification.

This invention relates to a tractor of the chain track type, and particularly to a novel form of draw-bar mounting and an auxiliary steering mechanism operable in conjunction with the draw-bar.

One of the objects of the present invention is to provide a novel form of draw-bar for tractors and a substantial mounting for same which permits the draw-bar to swing on a horizontal plane above the center of weight established in the tractor when this is hauling an average load and which will also permit the tractor to swing with relation to the draw-bar when this is attached to a load. Another object of the invention is to provide an auxiliary steering mechanism operable in conjunction with the draw-bar and adapted to maintain the tractor in a straight course when running. Further objects will hereinafter appear.

The invention consists of the parts and the construction and combination of parts as hereinafter more fully described and claimed, having reference to the accompanying drawings, in which—

Figure 1:
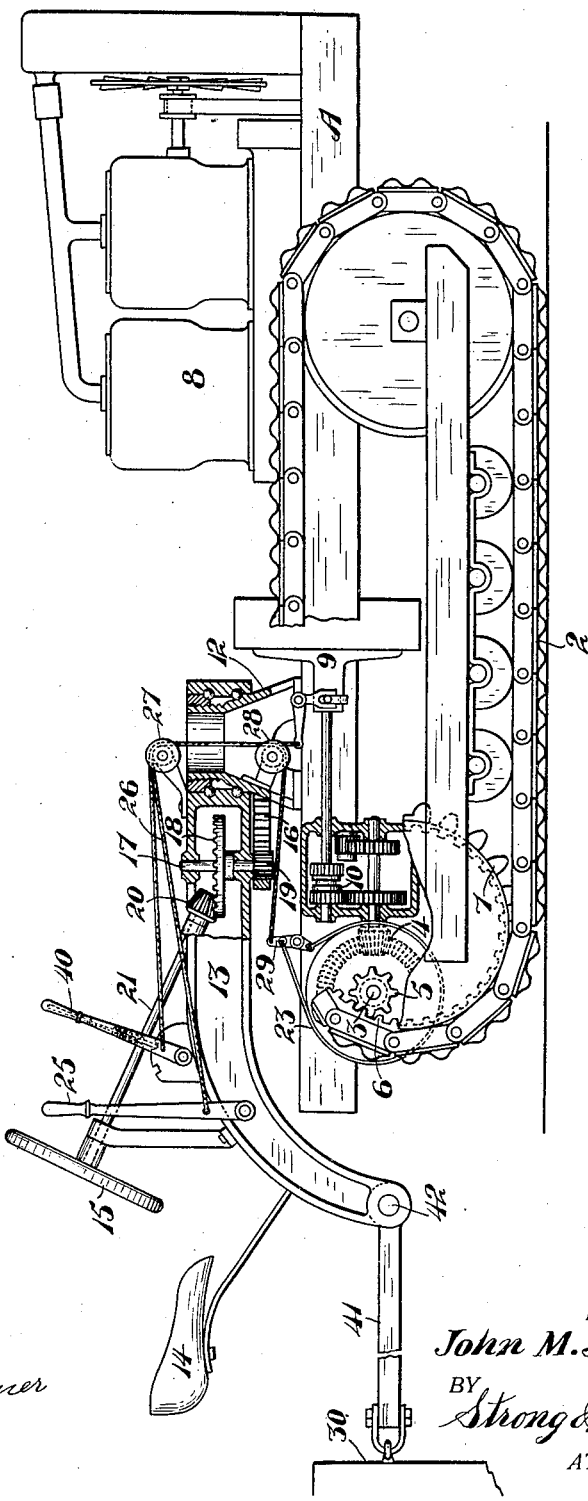
Figure 1 is a side elevation of the tractor, partly in section, showing the application of the invention.

Referring to the drawings in detail, A indicates the main frame of a tractor and 2 the chain tracks by which it is propelled. These tracks are arranged one on each side of the main frame, as shown, and are driven from a rear driving shaft 3 through a differential 4; each end of the driving shaft being provided with a pinion 5 which intermeshes with an internal gear 6, which in turn carries a sprocket 7 engageable with the chain track. The tractor is otherwise provided with an engine 8, of suitable construction, from which power is transmitted to the differential through a clutch 9 and any suitable form of gear transmission, such as shown at 10.

Suitably secured to the main frame, as at 11, is a hollow post 12, and turnably mounted on said post is a draw-bar 13. The post serves as a means for supporting the draw-bar and also serves as a means for supporting the driver's seat 14 and an auxiliary steering mechanism controlled by a hand wheel 15, which will hereinafter be described. Also secured to the main frame, below the draw-bar beam, is a semicircular toothed rack bar 16, and journaled in the draw-bar proper is a vertically positioned shaft 17 on which is secured a bevel gear 18 and a spur pinion 19 which intermeshes with the toothed rack bar 16.

Figure 2:
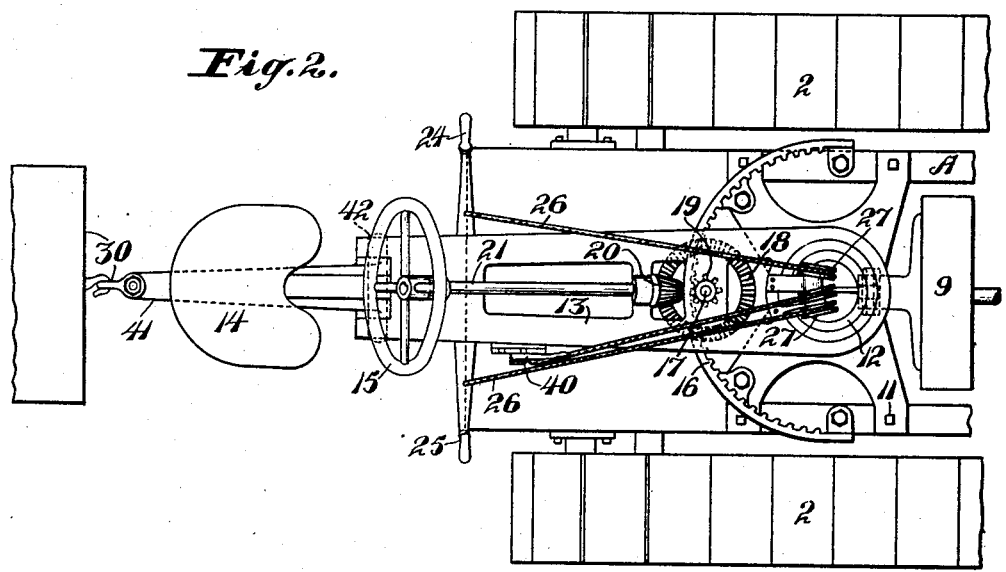
Fig. 2 is a plan view of the rear end of the tractor.
Figure 3:
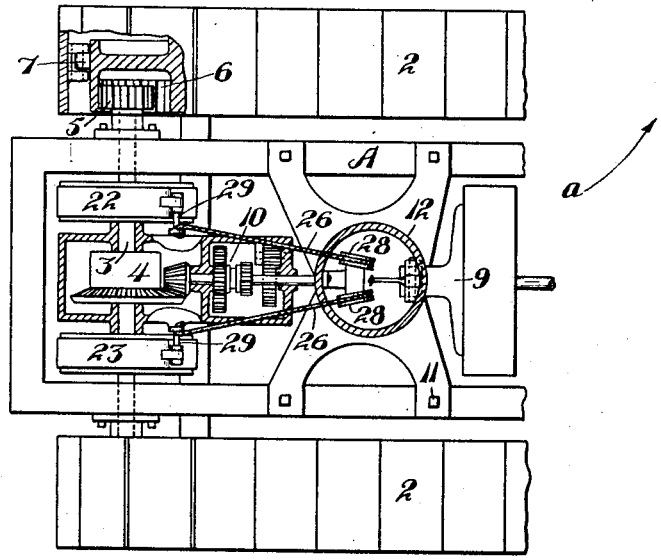
Fig. 3 is a plan section of the draw-bar post, the transmission and the differential casing.

The bevel gear 18 intermeshes with a bevel pinion 20 which is secured upon the shaft 21 carrying the steering wheel 15, and it is, therefore, possible to swing the draw-bar about the post 12 in either direction merely by turning the hand wheel 15. This is of considerable importance especially when maintaining a comparatively straight course under a load, as this can be accomplished by turning the tractor proper slightly to either side about a vertical axis through the post 12 by means of the hand wheel 15. However, for short and positive turns the tractor is provided with suitable brake bands, such as shown at 22 and 23. For instance, if it is desired to turn the tractor (see Figs 2 and 3) in the direction of arrow $a$ or to the left, it is necessary to tighten the brake band 22. This retards the speed of the chain track on the left side of the tractor and increases the speed of the chain track on the opposite side, thereby permitting the tractor to turn to the left.

Turning to the right is accomplished by retarding the speed of the track chain on the right side and increasing the speed of the track on the left side. Tightening or releasing of the brake bands can be accomplished by means of a pair of hand levers 24 and 25 which are pivotally mounted one on each side of the draw-bar and connected with the brake bands by means of cables 26 which pass over sheaves 27 carried by the draw-bar, the cables passing down through the hollow post and through sheaves 28 from where they are directed to the brake band toggles 29.

The operation of these brake bands when turning is a comparatively simple one, but the operation of said bands when trying to maintain a straight course is rather difficult.

The necessity of operating the main steering mechanism or the brakes 22 and 23 is entirely eliminated in the present instance, particularly when the tractor is hauling a load, such as indicated at 30, as the draw-bar naturally assumes a straight line with the load. Turning of the hand wheel 15 in one direction or the other will, therefore, tend to swing the tractor proper with relation to the draw-bar and the tractor may then be easily maintained on the straight course without much exertion on the part of the operator.

The main steering mechanism controlled by the brakes 22 and 23 is in this instance only employed when making a sharp turn, as steering, when maintaining a comparatively straight course, is controlled entirely from the hand wheel 15. This auxiliary steering attachment is dependent entirely upon the mounting of the draw-bar and the tendency of the load attached thereto to retain it in a straight line. It might, therefore, be stated that the draw-bar serves as a rudder to swing the tractor from one side to the other, and while it may not be positively relied on to make a sharp turn, it can be seen that it is of material assistance and a great advantage when maintaining a comparatively straight course.

While brake bands 22 and 23 are here shown which are operable in conjunction with a differential, it is obvious that the differential may be entirely eliminated and that clutches may be employed, if desired, for retarding the speed of either track or entirely freeing the same, if desired. The action of the auxiliary steering mechanism is, of course, the same when clutches or a differential and coöperating brakes, such as here shown, are employed.

The post 12 should be attached to the frame as close as possible to the center of load established in the tractor when this is hauling an average load. This is of great importance as it materially promotes the tractive power of the tractor. The pivotal mounting of the draw-bar is also an important feature as it not only permits the attachment of the auxiliary steering mechanism shown but it also maintains the line of pull at all times from the vertical axis through post 12 located approximately above the center of weight of the tractor when same is working under a normal load, thereby distributing the load on both track chains instead of throwing the whole load on the outside track as would be the case, when making a short turn, if the draw-bar did not pivot on the vertical axis of post 12.

The main clutch 9 connecting the engine shaft with the transmission shaft may be operated by a lever 40 mounted on the draw-bar and I also wish it understood that the lever for operating the gears in the transmission case may be positioned either upon the tractor proper or the draw-bar. Everything required for the control and operation of the tractor may, therefore, be placed within convenient reach of the driver, and as the steering under normal conditions is controlled from the wheel 15 it must be appreciated that a straight course can easily be maintained under all conditions.

The main draw-bar link, shown at 41, is pivotally attached to the lower end of the draw-bar, as at 42, and while it may swing vertically on this pivot to take care of undulations and obstructions in the roadbed, I wish it understood that lateral play of the link 41 will not be permitted as it would materially reduce the efficiency of the auxiliary steering mechanism.

The materials and finish of the other parts of the mechanism employed may be such as the experience and judgment of the manufacturer may dictate. I also wish it understood that various changes in form, proportions and minor details of construction may be resorted to within the scope of the appended claims and that I do not wish to limit myself to the specific design and construction here shown.

Having thus described my invention, what I claim and desire to secure by Letters Patent is—

1. In a tractor having a propelling chain track arranged on each side, a divided drive shaft adapted to transmit power to said tracks, means on said shaft for retarding the speed of either track, a hollow post secured on the tractor, a draw-bar adapted to swing horizontally about said post, means on the draw-bar for operating said track retarding means, and means on the draw-bar operable independently of said track retarding means for maintaining the tractor on a straight course when attached to a load.

2. In a tractor having a propelling chain track arranged on each side, a divided drive shaft adapted to transmit power to said tracks, a differential connecting the divided drive shaft, a brake drum on each shaft section, a hollow post secured on the tractor, a draw-bar mounted to swing horizontally about said post, a pair of levers mounted on the draw-bar, connections passing through the hollow post connecting each lever with each brake drum, a segmental rack bar secured to the tractor below the draw-bar, a vertically positioned shaft journaled in the draw-bar, a gear on said shaft engaging the rack bar, a bevel gear secured on said shaft, and a steering post having a hand wheel secured on one end and a bevel pinion on the opposite end which intermeshes with the bevel gear, said steering wheel with connected gears and rack bar being adapted to swing the tractor with relation to the draw-bar when the draw-bar it attached to a load.

3. A draw bar and steering assembly for tractors comprising a draw bar pivoted to the main frame for horizontal movement above said frame and said draw bar comprising a horizontal portion and a downwardly curved end portion to which the load is connected, and steering means operable from a seat on said downwardly curved portion, whereby the draw bar may be swung for directing the course of the tractor, said steering means comprising a steering wheel journaled on the draw bar, a stationary gear segment secured on the main frame, a gear carried by the draw bar and journaled thereon intermeshing with the gear segment, and means for transmitting a turning movement from the steering wheel to the gear.

4. A draw bar and steering assembly for tractors, comprising a draw bar pivoted to the main frame for horizontal movement above said frame and said draw bar comprising a horizontal portion and a downwardly curved end portion to which the load is connected, and steering means operable from a seat provided on said downwardly curved portion, whereby the draw bar may be swung for directing the course of the tractor.

5. In a tractor having a propelling chain track arranged on each side, a divided drive shaft adapted to transmit power to said tracks, means on said shaft for retarding the speed of either track, a hollow post secured on the tractor, a draw bar adapted to swing horizontally about said post, lever means on the draw bar for operating said track retarding means, the connecting means between said levers and track retarding means passing through said hollow post, and means on the draw bar operable independent of said track retarding means for maintaining the tractor on a straight course when attached to a load.

6. In a tractor having a propelling chain track arranged on each side, a divided drive shaft adapted to transmit power to said tracks, means on said shaft for retarding the speed of either track, a hollow post secured on the tractor, a draw bar adapted to swing horizontally about said post, means on the draw bar for operating said track retarding means, and means on said draw bar for starting and stopping said drive shaft, the connecting means of which pass through said hollow post, and means on the draw bar operable independently of said track retarding means for maintaining the tractor on a straight course when attached to a load.

7. In a tractor having a propelling chain track arranged on each side, a divided drive shaft adapted to transmit power to said tracks, means on said shaft for retarding the speed of either track, a hollow post secured on the tractor, a draw bar adapted to swing horizontally about said post, lever means on the draw bar for operating said track retarding means, the connecting means between said levers, and track retarding means passing through said hollow post, means on said draw bar for starting and stopping said drive shaft, the connecting means of which pass through said hollow post, and means on the draw bar operable independently of said track retarding means for maintaining the tractor on a straight course when attached to a load.

8. In a tractor having a propelling chain track arranged on each side, a divided drive shaft adapted to transmit power to said tracks, means on said shaft for retarding the speed of either track, a post secured on the tractor, a draw bar adapted to swing horizontally about said post, lever means on the draw bar for operating said track retarding means, and means on the draw bar operable independent of said track retarding means for maintaining the tractor on a straight course when attached to a load, said means comprising a steering wheel journaled on the draw bar, a stationary gear segment secured to the main frame, a gear carried by the draw bar and journaled therein intermeshing with the gear segment, and means for transmitting a turning movement from the steering wheel to the gear.

In testimony whereof I have hereunto set my hand in the presence of two subscribing witnesses.

JOHN M. JOHNSON.

Witnesses:
  W. W. HEALEY,
  M. E. EWING.